(12) United States Patent
Muto

(10) Patent No.: US 11,478,743 B2
(45) Date of Patent: Oct. 25, 2022

(54) HIGH TEMPERATURE THERMOCHEMICAL ENERGY STORAGE SYSTEM

(71) Applicant: Southern Research Institute, Birmingham, AL (US)

(72) Inventor: Andrew Jerome Muto, Cary, NC (US)

(73) Assignee: Southern Research Institute, Birmingham, AL (US)

( * ) Notice: Subject to any disclaimer, the term of this patent is extended or adjusted under 35 U.S.C. 154(b) by 508 days.

(21) Appl. No.: 16/574,440

(22) Filed: Sep. 18, 2019

(65) Prior Publication Data

US 2020/0094184 A1    Mar. 26, 2020

Related U.S. Application Data

(60) Provisional application No. 62/734,432, filed on Sep. 21, 2018.

(51) Int. Cl.
*B01D 53/62* (2006.01)
*B01D 53/82* (2006.01)
(Continued)

(52) U.S. Cl.
CPC .......... *B01D 53/02* (2013.01); *B01D 53/62* (2013.01); *B01D 53/82* (2013.01); *B01D 53/96* (2013.01); *B01J 20/041* (2013.01); *B01J 20/043* (2013.01)

(58) Field of Classification Search
CPC ......... B01D 53/02; B01D 53/62; B01D 53/82
See application file for complete search history.

(56) References Cited

U.S. PATENT DOCUMENTS 3,557,011 A * 1/1971 Columbo et al. .... B01J 20/3433
252/189
4,343,989 A   8/1982 Brosnan
(Continued)

FOREIGN PATENT DOCUMENTS

CN    1795257 A    6/2006
CN    1917263 A    2/2007
(Continued)

OTHER PUBLICATIONS

Derevschikov, et al, High Temperature CaO/Y2O3 Carbon Dioxide Absorbent with Enhanced Stability for Sorption-Enhanced Reforming Applications, I&EC research, 2011, 50, 12741-12749 (10 Pages).
(Continued)

*Primary Examiner* — Robert A Hopkins
(74) *Attorney, Agent, or Firm* — Ballard Spahr LLP

(57) ABSTRACT

A thermochemical energy storage system and method of storing thermal energy are described. The energy storing system described herein comprises a reactor comprising: a) a reactor with a $CO_2$ sorbent including MgO; and b) a supercritical $CO_2$ source with supercritical $CO_2$ and $H_2O$, wherein the supercritical $CO_2$ source is in fluid communication with the reactor and the $CO_2$ sorbent including MgO to allow flow of the supercritical $CO_2$ and $H_2O$ between the supercritical $CO_2$ source and the reactor, thereby allowing contact of $CO_2$ with the $CO_2$ sorbent comprising MgO.

19 Claims, 11 Drawing Sheets

(51) Int. Cl.
   *B01D 53/02* (2006.01)
   *B01J 20/04* (2006.01)
   *B01D 53/96* (2006.01)

(56) References Cited

U.S. PATENT DOCUMENTS

| | | | |
|---|---|---|---|
| 4,492,593 A * | 1/1985 | Diaz | C01B 32/50 |
| | | | 62/928 |
| 2009/0148369 A1 | 6/2009 | Mori | |
| 2010/0196259 A1 | 8/2010 | Garg et al. | |
| 2011/0100356 A1 | 5/2011 | Bliesner | |
| 2012/0025134 A1 | 2/2012 | Feng et al. | |
| 2012/0134906 A1 | 5/2012 | Mastin et al. | |
| 2013/0333391 A1 | 12/2013 | Sundaram et al. | |

FOREIGN PATENT DOCUMENTS

| | | |
|---|---|---|
| CN | 101972599 A | 2/2011 |
| CN | 102786236 A | 11/2012 |
| CN | 103133071 A | 6/2013 |
| CN | 103746083 A | 4/2014 |
| WO | WO-2013/003948 | 1/2013 |

OTHER PUBLICATIONS

Chen, et al, Development of a CaO-Based Sorbent with Improved Cyclic Stability for CO2 Capture in Pressurized Carbonation, Chemical Engineering Journal 171 (2011) 197-205 (11 Pages).

Vieille et al, Improvements of Calcium Oxide Based Sorbents for Multiple CO2 Capture Cycles, Powder Technology, Elsevier, 2012, 228, pp. 319-323 (11 Pages).

Martavaltzi et al, Development of New CaO Based Sorbent Materials for CO2 Removal at High Temperature, Science Direct, Microporous and Mesoporous Materials 110 (2008) 119-127 (9 pages).

Sabina Nwamaka Ude, Synthesis and Characterization of Doped Mayenite as a Transparent Conducting Oxide, University of Tennessee, May 2013, Doctoral Dissertation (169 pages).

Dursun Can Ozcan, Development of a Sorbent for Carbon Dioxide, Iowa State University, Graduate Theses and Dissertation, 2010 (108 Pages).

Radfarnia et al, Development of Zirconium-Stabilized Calcium Oxide Absorbent for Cyclic High-Temperature CO2 Capture, Ind. Eng. Chem. Res., 2012, 51 (31), pp. 10390-10398, Abstract (1 page).

Manovic et al, CaO-Based Pellets Supported by Calcium Aluminate Cements for High-Temperature CO2 Capture, Environ. Sci. Technol., 2009, 43 (18), pp. 7117-7122, Abstract (1 page).

Manovic et al, CO2 Carrying Behavior of Calcium Aluminate Pellets under High-Temperature/High-CO2 Concentration Calcination Conditions, Ind. Eng. Chem. Res., 2010, 49 (15), pp. 6916-6922, Abstract (1 Page).

Martavaltzi et al, Parametric Study of the CaO—Ca12Al14O33 Synthesis with Respect to High CO2 Sorption Capacity and Stability on Multicycle Operation, Ind. Eng. Chem. Res., 2008, 47 (23), pp. 9537-9543, Abstract (1 Page).

Li et al, Synthesis, Experimental Studies, and Analysis of a New Calcium-Based Carbon Dioxide Absorbent, Energy Fuels, 2005, 19 (4), pp. 1447-1452, Abstract (1 Page).

Chacartegui, R., et al. "Thermochemical energy storage of concentrated solar power by integration of the calcium looping process and a CO2 power cycle." Applied Energy 173 (2016): pp. 589-605.

Luo, Chong, et al. "Enhanced cyclic stability of CO 2 adsorption capacity of CaO-based sorbents using La 2 O 3 or Ca 12 Al 14 O 33 as additives." Korean Journal of Chemical Engineering 28.4 (2011): pp. 1042-1046.

Phalak, Nihar, Niranjani Deshpande, and L-S. Fan. "Investigation of high-temperature steam hydration of naturally derived calcium oxide for improved carbon dioxide capture capacity over multiple cycles." Energy & Fuels 26.6 (2012): pp. 3903-3909.

Li, Y-J, et al. "CO2 capture using CaO modified with ethanol/water solution during cyclic calcination/carbonation." Chemical engineering & technology 31.2 (2008): pp. 237-244.

Gangwal, S., Muto, A. "Demonstration of High-Temperature Calcium-Based Thermochemical Energy Storage System for Use with Concentrating Solar Power Facilities" CSP Program Summit 2015 (Presented Apr. 2016).

* cited by examiner

HIGH TEMPERATURE THERMOCHEMICAL ENERGY STORAGE SYSTEM

CROSS-REFERENCE TO RELATED APPLICATIONS

This application claims the benefit of U.S. Provisional Application No. 62/734,432, filed Sep. 21, 2018, which is hereby incorporated by reference in its entirety.

FEDERALLY SPONSORED RESEARCH

This invention was made with government support under DE-EE0008126 awarded by Office of Energy Efficiency & Renewable Energy of the U.S. Department of Energy. The government has certain rights in the invention.

BACKGROUND

Societal energy demands are constantly increasing while fossil fuel resources, the main energy resource of many national energy systems, are limited and predicted to become scarcer, and as a result to become more expensive in coming years. Furthermore, many concerns exist regarding the environmental impacts associated with continuous drilling and pumping of the fossil fuels from the Earth's crust and increasing energy consumption. Specifically, concerns have been raised regarding the possible effect of increased use of fossil fuels on climate change and atmospheric pollution.

Changes are required in energy systems, partly through the adoption of advanced energy technologies and systems to address these serious environmental concerns. The anticipated worldwide increase in energy demand and concern regarding environmental problems has become a driving force for the utilization of more efficient and cleaner energy technologies. Examples include advanced systems for waste energy recovery and energy integration. Important technologies that can contribute to avoiding environmental problems and increasing the efficiency of energy consumption include thermal energy storage (TES), and more specifically, thermochemical energy storage (TCES).

Thermal energy storage is especially an important technology in systems involving renewable energy sources as well as other energy resources as it can make their operation more efficient. One example is bridging the periods between when energy is harvested and when it is needed. For example, the next generation of advanced concentrating solar power (CSP) plants are being designed to increase the sunlight to electricity conversion efficiency, and one of the major techniques to enact this increase is through the use of receivers, heat transfer fluids (HTF), thermal energy storage systems, and power blocks that operate at high temperatures. It was found that CSP systems, for example, require thermal energy storage to be competitive with conventional grid scale power generation systems. Thus, TES can play an important role in increasing the contribution of various types of renewable energy in the energy production of regions and countries.

Various TES technologies and applications exist. The selection of a TES system for a particular application depends on many factors, including storage duration, economics, supply and utilization temperature requirements, storage capacity, heat loss and available space.

More compact TES can be achieved based on a system that utilize chemical reactions. However, the current-state-of the-art molten salt based thermal storage systems are unable to operate in the high temperature range required, for example, in CSP systems. High temperature thermal energy is generally stored as sensible heat in either molten salt or synthetic organic heat transfer oil. However, these mediums store heat in a very low volumetric energy density and are not able to store heat above 500° C.

Therefore, thermochemical energy storage systems exhibiting very high volumetric energy density and capable of operating through a wide temperature range are needed. Even further, improved methods for storing energy would be desirable.

Accordingly, such thermochemical energy storage systems and methods for storing energy are described herein.

SUMMARY OF THE INVENTION

Disclosed herein is a system for storing energy comprising: a) a reactor comprising a $CO_2$ sorbent comprising MgO; and b) a supercritical $CO_2$ source comprising supercritical $CO_2$ and $H_2O$, wherein the supercritical $CO_2$ source is in fluid communication with the reactor and the $CO_2$ sorbent comprising MgO to allow flow of the supercritical $CO_2$ and $H_2O$ between the supercritical $CO_2$ source and the reactor, thereby allowing contact of $CO_2$ with the $CO_2$ sorbent comprising MgO.

Also disclosed herein disclosed herein is a system for storing energy comprising: a) a reactor comprising a $CO_2$ sorbent comprising MgO and a liquid carbonate promoter; and b) a supercritical $CO_2$ source comprising supercritical $CO_2$, wherein the supercritical $CO_2$ source is in fluid communication with the reactor and the $CO_2$ sorbent comprising MgO to allow flow of the supercritical $CO_2$ between the supercritical $CO_2$ source and the reactor, thereby allowing contact of $CO_2$ with the $CO_2$ sorbent comprising MgO.

Also disclosed herein is a system for storing energy comprising: a) a reactor comprising a $CO_2$ sorbent comprising MgO and a liquid carbonate promoter; and b) a supercritical $CO_2$ source comprising supercritical $CO_2$ and $H_2O$, wherein the supercritical $CO_2$ source is in fluid communication with the reactor and the $CO_2$ sorbent comprising MgO to allow flow of the supercritical $CO_2$ and $H_2O$ between the supercritical $CO_2$ source and the reactor, thereby allowing contact of $CO_2$ with the $CO_2$ sorbent comprising MgO.

Also disclosed herein is a method for storing energy comprising the steps of: a) in a reactor, in the presence of $H_2O$ and/or a carbonate, heating $MgCO_3$ with supercritical $CO_2$ having a temperature of at least 450° C., thereby promoting an endothermic chemical reaction to produce $CO_2$ and MgO; and b) separating the $CO_2$ from the MgO.

Also disclosed herein is a method of storing energy comprising contacting $MgCO_3$ with supercritical $CO_2$ having a temperature of at least 450° C. in the presence of $H_2O$ and/or a carbonate in the system disclosed herein, to thereby store energy.

Additional advantages will be set forth in part in the description which follows, and in part will be obvious from the description, or can be learned by practice of the aspects described below. The advantages described below will be realized and attained by means of the chemical compositions, methods, and combinations thereof particularly pointed out in the appended claims. It is to be understood that both the foregoing general description and the following detailed description are exemplary and explanatory only and are not restrictive of the invention, as claimed.

DESCRIPTION OF THE FIGURES

The accompanying figures, which are incorporated in and constitute a part of this specification, illustrate several aspects, and together with the description, serve to explain the principles of the invention.

DETAILED DESCRIPTION

Figure 1:
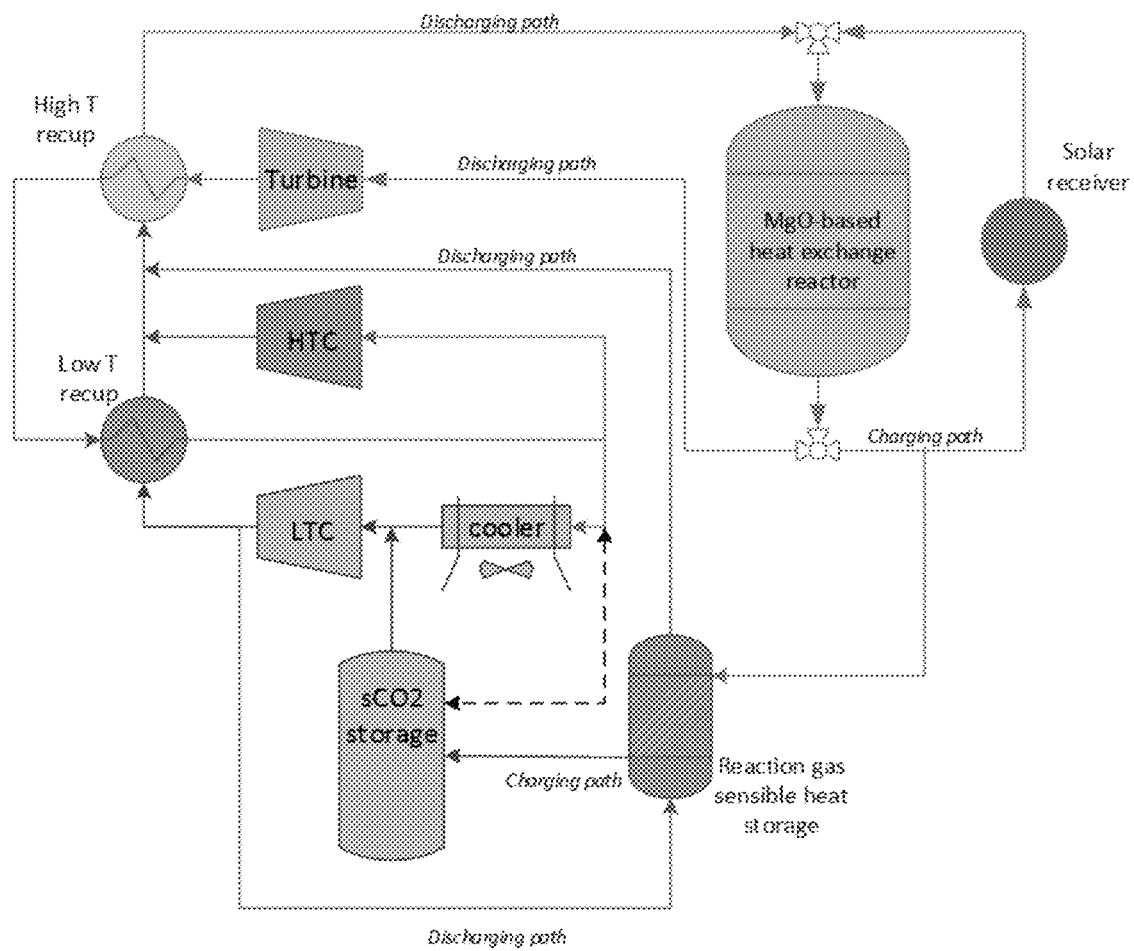
FIG. 1 shows a process flow diagram of a TCES system described herein.

The present invention can be understood more readily by reference to the following detailed description of the invention.

Disclosed herein are systems, materials, compounds, compositions, and components that can be used for, can be used in conjunction with, can be used in preparation for, or are products of the disclosed method and compositions. It is to be understood that when combinations, subsets, interactions, groups, etc. of these materials are disclosed that while specific reference of each various individual and collective combinations and permutation of these compounds cannot be explicitly disclosed, each is specifically contemplated and described herein. This concept applies to all aspects of this disclosure including, but not limited to, steps in methods of making and using the disclosed compositions. Thus, if there are a variety of additional steps that can be performed it is understood that each of these additional steps can be performed with any specific aspect or combination of aspects of the disclosed methods, and that each such combination is specifically contemplated and should be considered disclosed.

All publications mentioned herein are incorporated herein by reference to disclose and describe the methods and/or materials in connection with which the publications are cited.

1. Definitions

In this specification and in the claims that follow, reference will be made to a number of terms that shall be defined to have the following meanings:

Throughout this specification, unless the context requires otherwise, the word "comprise," or variations such as "comprises" or "comprising," will be understood to imply the inclusion of a stated integer or step or group of integers or steps but not the exclusion of any other integer or step or group of integers or steps.

It must be noted that, as used in the specification and the appended claims, the singular forms "a," "an" and "the" include plural referents unless the context clearly dictates otherwise. Thus, for example, reference to "a system" includes combination of two or more such systems, and the like.

"Optional" or "optionally" means that the subsequently described event or circumstance can or cannot occur, and that the description includes instances where the event or circumstance occurs and instances where it does not.

"Consists essentially of" limits the scope to the specified materials (i.e. MgO) or steps and those that do not materially affect the basic and novel characteristic(s) of the claimed invention.

"Consisting of" limits the scope to the specified materials (i.e. MgO).

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The term "thermal energy storage" as defined herein is referenced to a system capable of temporary holding thermal energy in substances for later utilization.

The term "sensible thermal energy storage" as defined herein is referenced to energy stored in vibrational modes of molecules. Sensible TES systems store energy by changing the temperature of the storage medium, which can be water, brine, rock, soil, concrete, sand, molten salt and the like.

The term "latent thermal energy storage" as defined herein is referenced to energy stored in medium as it changes phase, for example cold storage water/ice and heat storage by melting paraffin waxes.

The term "thermochemical energy storage" is referred to energy stored in chemical bonds of molecules, or in the reaction between the reactants. For example, metal oxides, reversible reduction oxidation reactions, and the like. Thermochemical energy storage can also include a system that allows separation of reactants that can be subsequently combined again in exothermic reaction. For example, the separation and later re-combination of $CO_2$ and MgO.

The term "sorbent" as used herein is referred to a solid material capable of absorbing \ liquids or gases via fluid-solid chemical reaction The term "heat exchange reactor" as used herein is referred to a reactor used to transfer heat between one or more fluids. The fluids can be separated by a solid wall to prevent mixing or they can be in direct contact.

The term "adiabatic reactor" as used herein is referred to a reactor that utilizes an adiabatic process that occurs without loss of heat, or matter, between the reactor and its surroundings.

The terms "gas expander" or "turbo expander," or "expansion turbine" or "turbine" can be used interchangeably and are referred to a centrifugal or axial flow turbine through which a high pressure gas is expanded to produce work.

The term "exothermic reaction" as referred herein is a chemical reaction that releases energy by heat.

The term "endothermic reaction" as referred herein is a reaction in which the system absorbs energy from its surroundings. In some aspects, the absorbed energy is in the form of heat.

A supercritical fluid as described herein is a fluid at a temperature above its critical temperature and at a pressure above its critical pressure. A supercritical fluid exists at or above its "critical point," the point of highest temperature and pressure at which the liquid and vapor (gas) phases can exist in equilibrium with one another. Above critical pressure and critical temperature, the distinction between liquid and gas phases disappears. A supercritical fluid possesses approximately the penetration properties of a gas simultaneously with the solvent properties of a liquid. Accordingly, supercritical fluid extraction has the benefit of high penetrability and good solvation.

As used herein, a fluid which is "supercritical" (e.g. supercritical $CO_2$) indicates a fluid which would be supercritical if present in pure form under a given set of temperature and pressure conditions.

A weight percent of a component, unless specifically stated to the contrary, is based on the total weight of the formulation or composition in which the component is included.

Disclosed are compounds, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a number of different polymers and agents are disclosed and discussed, each and every combination and permutation of the polymer and agent are specifically contemplated unless specifically indicated to the contrary. Thus, if a class of molecules A, B, and C are disclosed as well as a class of molecules D, E, and F and an example of a combination molecule, A-D is disclosed, then even if each is not individually recited, each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to, steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

2. System

Disclosed herein is a system that can allow affordable and efficient storage of energy. It is desirable to obtain a thermal energy storage system having a high cyclic durability, high volumetric energy density, capable of operating throughout a wide temperature range, while still providing economic feasibility. An advantage of thermochemical energy storage systems over other energy storage systems is the small temperature range ($\Delta T$) over which the charge and discharge cycle occurs, typically around 25-50° C. This small temperature range allows for high exergetic round-trip efficiency, and has the potential to couple well with power cycles that approximate the Carnot ideal of heat transfer at constant temperature. The system disclosed herein utilizes a reversible gas-solid reaction, wherein the claimed reaction has substantially no potential side reaction, and the reactants and/or products are non-toxic and non-corrosive. The energy storage described herein uses highly reversible and highly energetic gas-solid reaction to store energy on a thermochemical basis.

Accordingly, disclosed herein is a system for storing energy comprising: a) a reactor comprising a $CO_2$ sorbent comprising MgO; and b) a supercritical $CO_2$ source comprising supercritical $CO_2$ and $H_2O$, wherein the supercritical $CO_2$ source is in fluid communication with the reactor and the $CO_2$ sorbent comprising MgO to allow flow of the supercritical $CO_2$ and $H_2O$ between the supercritical $CO_2$ source and the reactor, thereby allowing contact of $CO_2$ with the $CO_2$ sorbent comprising MgO.

Also disclosed herein disclosed herein is a system for storing energy comprising: a) a reactor comprising a $CO_2$ sorbent comprising MgO and a liquid carbonate promoter; and b) a supercritical $CO_2$ source comprising supercritical $CO_2$, wherein the supercritical $CO_2$ source is in fluid communication with the reactor and the $CO_2$ sorbent comprising MgO to allow flow of the supercritical $CO_2$ between the supercritical $CO_2$ source and the reactor, thereby allowing contact of $CO_2$ with the $CO_2$ sorbent comprising MgO. In one aspect, the system for storing energy comprises: a) a reactor comprising a $CO_2$ sorbent comprising MgO and a liquid carbonate promoter; and b) a supercritical $CO_2$ source comprising supercritical $CO_2$ and $H_2O$, wherein the supercritical $CO_2$ source is in fluid communication with the reactor and the $CO_2$ sorbent comprising MgO to allow flow of the supercritical $CO_2$ and $H_2O$ between the supercritical $CO_2$ source and the reactor, thereby allowing contact of $CO_2$ with the $CO_2$ sorbent comprising MgO.

The systems disclosed herein utilize a highly reversible gas-solid carbonation-decarbonation reaction cycle using a $CO_2$ sorbent. In some aspects, a high temperature carbonation-decarbonation cycle can be based on the reaction shown in Scheme 1:

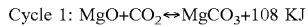

Cycle 1: $MgO + CO_2 \leftrightarrow MgCO_3 + 108$ KJ     (Scheme 1)

It is understood that the described cycle is based on the reversible reactions of carbon dioxide with solid magnesium oxide. The magnesium oxide carbonates to form solid magnesium carbonate. In certain aspects, the sorbents described herein can undergo, without degradation, repeated endothermic-exothermic carbonation cycles at a described above temperature range in a closed loop system.

Figure 4:
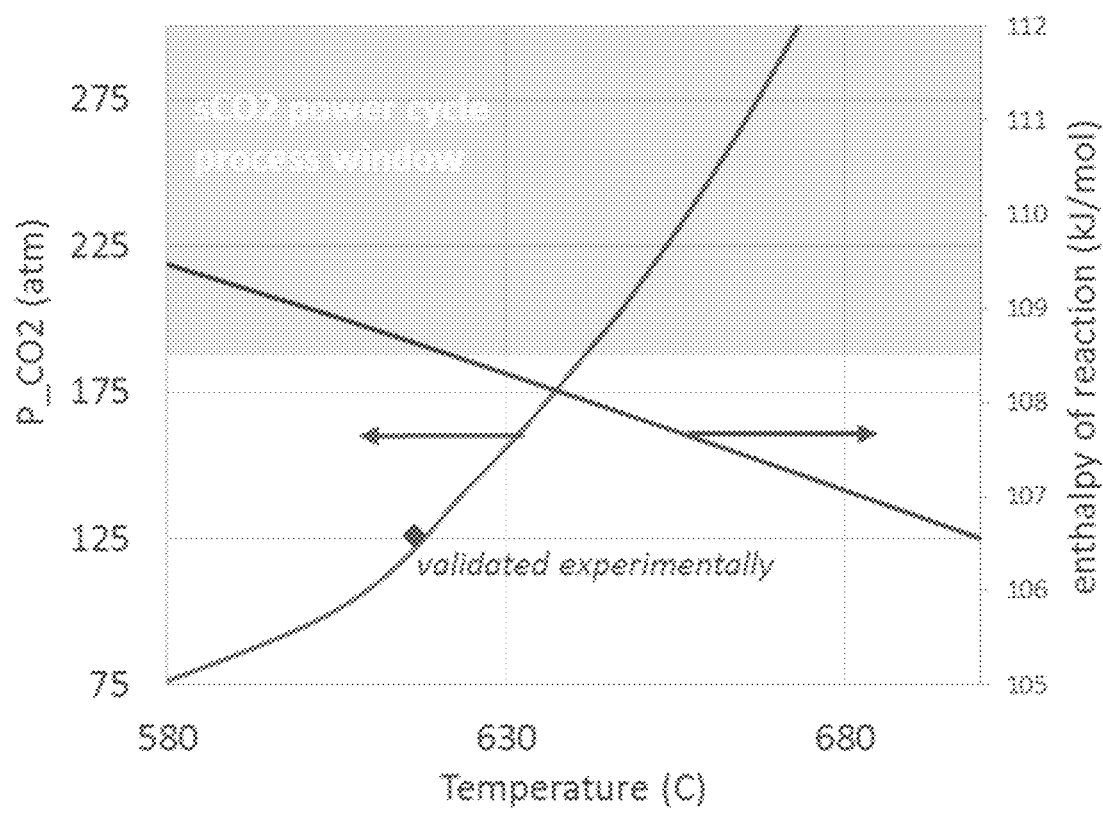
FIG. 4 shows a gas-solid reaction equilibrium of MgO/$MgCO_3$.

The gas-solid reaction equilibrium of MgO/MgCO$_3$ is shown in FIG. 4.

The systems disclosed herein include one or more promoters. In one aspect, the one or more promoters can be one or more kinetic promoters. In another aspect, the one or more promoters can be one or more thermodynamics promoters. The one or more promotors can be a liquid or gaseous. In one aspect, the one or more promoters can be thermodynamically stable.

In one aspect, $H_2O$ is present in the system and acts a promoter. As described herein, the $H_2O$ can be present together with supercritical $CO_2$ in the supercritical $CO_2$ source. The $H_2O$ is added as a liquid to the supercritical $CO_2$ source. The addition of the $H_2O$ provides several advantages in the system. One issue that can reduce the efficiency of the system is sintering of MgO/MgCO$_3$ during the decarbonation phase. The use of $H_2O$ as a promoter useful, because increasing $P_{H2O}$ increases reaction kinetics during carbonation (see Scheme 1). Then the $H_2O$ minimizes the sintering of MgO/MgCO$_3$ $P_{H2O}$ is decreased during decarbonation phase (see Scheme 1). A non-limiting example of the use of $H_2O$ as a promoter is as follows: 1) $H_2O$ is added to the supercritical $CO_2$ source, which then comprises supercritical $CO_2$ and $H_2O$; 2) the temperature of the supercritical $CO_2$ source, which then comprises supercritical $CO_2$ and $H_2O$ is increased in temperature to expand the $CO_2$ and along with the $H_2O$ is transferred to the reactor; 3) after discharge of the system, the $H_2O$ is stagnant in the reactor helping to promote the kinetics of the carbonation in the $2^{nd}$ reaction regime, which is considered slow; 4) during decarbonation (system charging) evolved $CO_2$ carries the $H_2O$ away with it back to the supercritical $CO_2$ source where it condenses; 5) when the reactor is sitting ideal in the carbonated state (charged) $P_{H2O}$ and sintering rate is at a minimum. Thus, the use of $H_2O$ as a promoter provides for a functionality that allows for an increase in kinetics during carbonation, but avoids excessive sintering during decarbonation.

In one aspect, as described herein, a carbonate is present in the reactor and acts as a promoter. The carbonate is in liquid form. A carbonate promoter promote the kinetics of the carbonation in the $2^{nd}$ reaction regime, which is considered slow. Carbonate promoters provide for increased kinetics in the reactor and are thermodynamically stable. In one aspect, the carbonate is selected from the group consisting of sodium carbonate, lithium carbonate, and potassium carbonate, or a mixture thereof. For example, the carbonate can be sodium carbonate. In another example, the carbonate can be lithium carbonate. In yet another example, the carbonate can be potassium carbonate. In yet another example, the carbonate can be a mixture of at least two of sodium carbonate, lithium carbonate, and potassium carbonate.

In one aspect, as described herein, the system can comprise both $H_2O$ and a carbonate as promoters.

In one aspect, the ratio of $H_2O$ to supercritical $CO_2$ in the supercritical $CO_2$ source is from $3.6*10^{-5}$% by weight to 1% by weight. For example, the ratio of $H_2O$ to supercritical $CO_2$ in the supercritical $CO_2$ source can be from $1.0*10^{-5}$% by weight to 1% by weight. In another example, the ratio of $H_2O$ to supercritical $CO_2$ in the supercritical $CO_2$ source can be from $1.0*10^{-4}$% by weight to 1% by weight. In yet another example, the ratio of $H_2O$ to supercritical $CO_2$ in the supercritical $CO_2$ source can be from $1.0*10^{-3}$% by weight to 1% by weight. In yet another example, the ratio of $H_2O$ to supercritical $CO_2$ in the supercritical $CO_2$ source can be from 0.01% by weight to 1% by weight. In yet another example, the ratio of $H_2O$ to supercritical $CO_2$ in the supercritical $CO_2$ source can be from 0.05% by weight to 1% by weight. In yet another example, the ratio of $H_2O$ to supercritical $CO_2$ in the supercritical $CO_2$ source can be from 0.1% by weight to 1% by weight. In yet another example, the ratio of $H_2O$ to supercritical $CO_2$ in the supercritical $CO_2$ source can be from 0.3% by weight to 1% by weight. In yet another example, the ratio of $H_2O$ to supercritical $CO_2$ in the supercritical $CO_2$ source can be from 0.5% by weight to 1% by weight. In yet another example, the ratio of $H_2O$ to supercritical $CO_2$ in the supercritical $CO_2$ source can be from $3.6*10^{-5}$% by weight to 0.5% by weight. In yet another example, the ratio of $H_2O$ to supercritical $CO_2$ in the supercritical $CO_2$ source can be from $3.6*10^{-5}$% by weight to 0.3% by weight. In yet another example, the ratio of $H_2O$ to supercritical $CO_2$ in the supercritical $CO_2$ source can be from $3.6*10^{-5}$% by weight to 0.1% by weight. In yet another example, the ratio of $H_2O$ to supercritical $CO_2$ in the supercritical $CO_2$ source can be from $3.6*10^{-5}$% by weight to 0.05% by weight. In yet another example, the ratio of $H_2O$ to supercritical $CO_2$ in the supercritical $CO_2$ source can be from $3.6*10^{-5}$% by weight to 0.01% by weight. In yet another example, the ratio of $H_2O$ to supercritical $CO_2$ in the supercritical $CO_2$ source can be from $3.6*10^{-5}$ by weight to $1.0*10^{-3}$% by weight. In yet another example, the ratio of $H_2O$ to supercritical $CO_2$ in the supercritical $CO_2$ source can be from $3.6*10^{-5}$% by weight to $1.0*10^{-4}$% by weight.

In one aspect, the ratio of liquid carbonate to MgO in the reactor is from 1% by weight to 50% by weight. For example, the ratio of liquid carbonate to MgO in the reactor is from 5% by weight to 50% by weight. In another example, the ratio of liquid carbonate to MgO in the reactor is from 10% by weight to 50% by weight. In yet another example, the ratio of liquid carbonate to MgO in the reactor is from 20% by weight to 50% by weight. In yet another example, the ratio of liquid carbonate to MgO in the reactor is from 30% by weight to 50% by weight. In yet another example, the ratio of liquid carbonate to MgO in the reactor is from 1% by weight to 40% by weight. In yet another example, the ratio of liquid carbonate to MgO in the reactor is from 1% by weight to 30% by weight. In yet another example, the ratio of liquid carbonate to MgO in the reactor is from 1% by weight to 20% by weight. In yet another example, the ratio of liquid carbonate to MgO in the reactor is from 1% by weight to 10% by weight. In yet another example, the ratio of liquid carbonate to MgO in the reactor is from 1% by weight to 5% by weight.

In one aspect, solid particles can be present in the reactor. Such solid particles can act as physical barriers to decrease agglomeration and sintering of the MgO active species, as compared to when no solid particles are present. In one aspect, the solid particles can be alumina, silica, or carbon particles.

In one aspect, the $CO_2$ sorbent comprising MgO can be produced via pelletization. The pelletization can be done via a hydraulic press, for example, without a binder. Such a pelletization technique can be used to increase the energy density.

Figure 9:
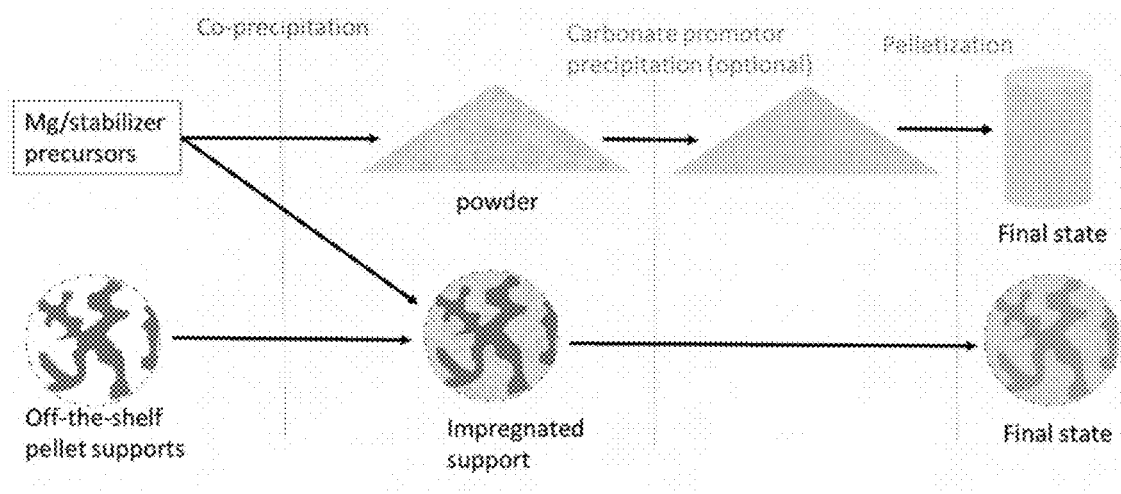
FIG. 9 shows the a non-limiting example of the process of making MgO sorbents disclosed herein.

In one aspect, the $CO_2$ sorbent comprising MgO can be supported. A supported $CO_2$ sorbent comprising MgO can be produced by impregnation. The support can be activated carbon, alpha-alumina, silica, vermiculite, or zirconia, or a mixture thereof. Such a support provides for stability and high surface area. See FIG. 9.

The supercritical $CO_2$ source can comprise any source known in the art. In some aspects, for example and without limitation the supercritical $CO_2$ source can comprise a commercially available $CO_2$ provided in a storage tank, which can be in a supercritical state within the supercritical $CO_2$ source, such as for example at about 74 atm at about 31° C.

In one aspect, the supercritical $CO_2$ source can be located at least partially underground. In another aspect, the supercritical $CO_2$ source can be located fully underground.

In one aspect, the $CO_2$ sorbent consists essentially of MgO. In another aspect, the $CO_2$ sorbent consists of MgO.

It is further understood that in some aspects, the $CO_2$ sorbent can operate at temperatures greater than about 450° C., greater than about 500° C., greater than about 550° C., greater than about 600° C., greater than about 650° C., greater than about 700° C., greater than about 750° C., greater than about 800° C., or greater than about 850° C. In yet other aspects, the $CO_2$ sorbents can operate in a temperature range from about 450° C. to about 900° C., including exemplary values of about 450° C., about 500° C., about 550° C., about 600° C., about 650° C., about 700° C., about 750° C., about 800° C., about 850° C., and about 900° C. In yet other aspects, the $CO_2$ sorbents can operate in any temperature range between any two of the above stated values. For example, the $CO_2$ sorbents can operate from about 450° C. to about 800° C., about 650° C. to about 850° C., or from about 700° C. to about 900° C.

The solid-phase MgO and $MgCO_3$ reactants are contained within the reactor, for example a single pressure reactor. In the discharged state, the reactor is filled with $MgCO_3$ at a reduced temperature, for example, from about 450° C. to about 650° C. To charge the reactor, $CO_2$ is heated in part by the heat source to a temperature from about 600° C. to about 900° C., for example, from about 650° C. to about 750° C., and a portion passes through the reactor, which decomposes the $MgCO_3$ to MgO and $CO_2$. During energy discharge, the heat source can be bypassed allowing lower temperature, for example, from about 450-650° C., $CO_2$ to enter the reactor. The $CO_2$ can be present in the reactor as a gas or in a supercritical stage. A portion of this $CO_2$ reacts with the MgO, and releases heat, which increases the temperature of the remainder of the supercritical $CO_2$, which can then be expanded through a turbine to generate electricity.

It is understood that the pressure in the reactor is elevated. For example, the pressure in the reactor can be at least about 50 atm, at least about 70 atm, at least about 100 atm, at least about 150 atm, at least about 200 atm, at least about 250 atm, at least about 300 atm, or at least about 350 atm. In another example, the pressure in the reactor can be from about 50 atm to about 400 atm, such for example from about 50 atm to about 200 atm, from about 50 atm to about 100 atm, from about 200 atm to about 400 atm, or from about 250 atm to about 350 atm. The pressures and temperatures disclosed herein can be combined in as desired. For example, during the discharge cycle the pressure can be from about 50 atm to about 100 atm and have a temperature from about 550° C. to about 650° C. In another example, during the charge cycle the pressure can be from about 250 atm to about 350 atm and have a temperature from about 650° C. to about 750° C.

In certain aspects, the $CO_2$ sorbent is a porous sorbent. In still further aspects, the pores of the sorbent can have a diameter in the range from about 1 nm to about 200 nm, for example from about 5 nm to about 200 nm, including exemplary values of about 3 nm, about 5 nm, about 8 nm, about 10 nm, about 15 nm, about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 90 nm, about 95 nm, about 100 nm, about 120 nm, about 140 nm, about 160 nm, and about 180 nm. In yet other aspects, the sorbent comprises micropores having a diameter in the range from about 1 nm to about 10 nm, including exemplary values of about 2 nm, about 3 nm, about 4 nm, about 5 nm, about 6 nm, about 7 nm, about 8 nm, and about 9 nm. In still further aspects, the micropores can have a diameter between any two of the above stated values. In yet other aspects, the sorbent can comprise mesopores having a diameter in the range from about 10 nm to about 100 nm, including exemplary values of about 20 nm, about 30 nm, about 40 nm, about 50 nm, about 60 nm, about 70 nm, about 80 nm, and about 90 nm. In still further aspects, the sorbent can comprise macropores with a diameter greater than about 100 nm. It is understood that in some aspects, the greater pore diameter can result in a decreased total pore surface area.

In certain aspects, the $CO_2$ sorbent described herein have a surface area in the range from about 1 to about 1,000 $m^2/g$, including exemplary values ranging from of about 5 to 50 $m^2/g$.

It is further understood that the pore diameter of the sorbent can be affected by a temperature. In some aspects, at the higher reaction temperatures the sorbent can undergo sintering and form agglomerates having a higher pore size.

In certain aspects, the $CO_2$ sorbent can be heat treated in a non-reacting gas such as nitrogen, air, or helium prior to the use in a system at a temperature from about 600° C. to about 1,000° C., including exemplary values of about 650° C., about 700° C., about 750° C., about 800° C., about 850° C., about 900° C., and about 950° C., thereby producing a heat treated sorbent. In some aspects, the heat treatment is performed for a period of time from about 10 minutes to about 60 minutes, including exemplary values of about 20 minutes, about 30 minutes, about 40 minutes, and about 50 minutes. In yet other aspects, the sorbent is heat treated in a steam. In yet other aspects, following this heat treatment, the sorbent can be further heat treated in a gas containing about 2 to about 30 volume % $CO_2$ from about 600° C. to about 800° C., including exemplary values of about 650° C., about 700° C., and about 750° C. In yet other aspects, the heat treatment can be done for a time period of about 4 to about 20 hours, including exemplary values of about 6, about 8, and about 12 hours. In certain aspects, the heat treatment of the sorbent prior to the use in a system improves the sorbent durability and stability. In certain aspects, the heat treatment of the sorbent can improve a reaction rate (e.g. to increase the amount of $CO_2$ that can be reacted with the sorbent in a given time). In certain exemplary aspects, the absorption of $CO_2$ during the first reaction cycle lasting for about an can be increased from about 10 wt % to about 36 wt %, including exemplary values of about 15 wt. %, about 20 wt %, about 25 wt. %, about 30 wt. %, and about 35 wt. %, comparatively to a substantially identical sorbent that was not heat treated prior to use in a system. Without wishing to be bound by any theory, it is hypothesized that the heat treating of the sorbent prior to the use in a system can activate the sorbent by structuring the surface morphology and increasing access of the $CO_2$ to the pore structure.

In yet other aspects, the $MgCO_3$ can undergo a regeneration process at a temperature from about 450° C. to about 950° C., for example from about 550° C. to about 800° C., about 600° C. to about 800° C. including exemplary values of about 550° C., of about 600° C., about 700° C., about 750° C., about 800° C., about 850° C., and about 900° C., which is achieved with heated $CO_2$. This regeneration of $MgCO_3$ can be performed for a time period of about 30 minutes to about 12 hours, including exemplary values of about 1 hour, about 1.5 hour, about 2 hours, about 2.5 hours, about 3 hours, about 3.5 hours, about 4 hours, about 4.5 hours, about 5 hours, about 5.5 hours, about 6 hours, about 6.5 hours, about 7 hours, about 7.5 hours, about 8 hours, about 8.5 hours, about 9 hours, about 9.5 hours, about 10 hours, about 10.5 hours, about 11 hours, and about 11.5 hours, in the presence of $CO_2$. In some aspects, the regeneration process can convert the magnesium carbonate ($MgCO_3$) back to magnesium oxide (MgO) to make it ready for the next cycle. Without wishing to be bound by any theory it is hypothesized that the regeneration process can rejuvenate the sorbent to its activated state without causing a loss in sorbent durability so that cycles can be repeated multiple times. It is further understood that the regeneration process can be conducted in the presence of $CO_2$.

In certain aspects, the $CO_2$ sorbent described herein can withstand from about 100 to about 30,000 reaction cycles without any substantial degradation, including exemplary values of about 200, about 500, about 1,000, about 1,500, about 2,000, about 2,500, about 3,000, about 3,500, about 4,000, about 4,500, about 5,500, about 6,000, about 6,500, about 7,000, about 7,500, about 8,000, about 8,500, about 9,000, about 9,500, about 10,000, about 10,500, about 11,000, about 11,500, about 12,000, about 12,500, about 13,000, about 13,500, about 14,000, about 14,500, about 15,500, about 16,000, about 16,500, about 17,000, about 17,500, about 18,000, about 18,500, about 19,000, about 19,500, about 20,000, about 20,500, about 21,000, about 21,500, about 22,000, about 22,500, about 23,000, about 23,500, about 24,000, about 24,500, about 25,500, about 26,000, about 26,500, about 27,000, about 27,500, about 28,000, about 28,500, about 29,000, and about 29,500. In yet other aspects, the $CO_2$ sorbent described herein can withstand any number of cycles in between any cited above values without any substantial degradation. In some aspects, the $CO_2$ sorbent can withstand from about 1,000 to about 20,000 cycles or from about 5,000 to about 30,000 cycles without any substantial degradation.

In certain aspects, the absence of the substantial degradation of the $CO_2$ sorbent can be determined by an amount of the $CO_2$ that can react with the $CO_2$ sorbent in each consequent reaction cycle conducted after the first cycle as compared to an amount of the $CO_2$ reacted with the $CO_2$ sorbent in the first cycle. In some aspects, the amount of the $CO_2$ reacted with the $CO_2$ sorbent in each consequent reaction cycle conducted after the first cycle is at least about 50% of the $CO_2$ reacted with the $CO_2$ sorbent in the first cycle, at least about 55%, at least about 60%, at least about 65%, at least about 70%, at least about 75%, at least about 80%, at least about 85%, at least about 90%, at least about 95%, at least about 99%, or at least about 99.8% of $CO_2$ reacted with the $CO_2$ sorbent in the first cycle.

Figure 2:
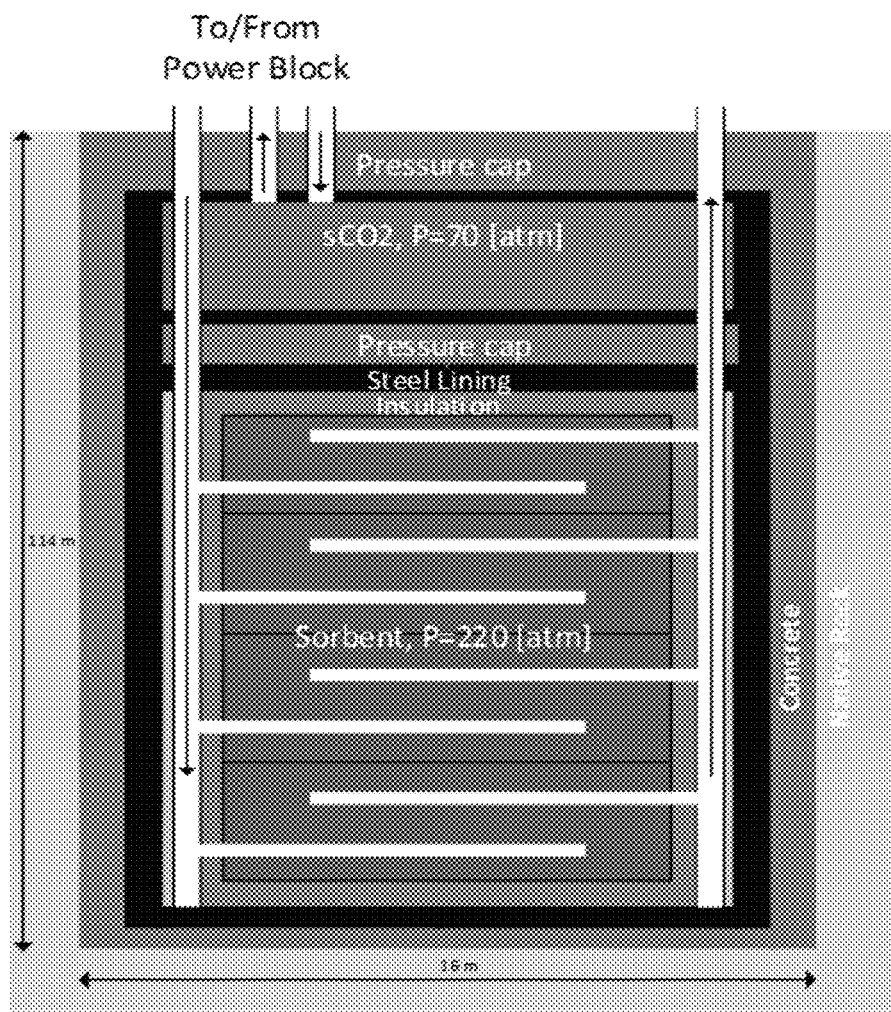
FIG. 2 show an exemplary design of a reactor disclosed herein, such as a heat exchange reactor.

In some aspects, the reactor described herein can comprise a heat exchange reactor or an adiabatic reactor. An example of a design of a reactor disclosed herein is shown in FIG. 2. In certain aspects, the reactor is a heat exchange reactor. In other aspects, the reactor is an adiabatic reactor. It is understood that any heat exchange and adiabatic reactors known in the art can be utilized. It is further understood that the reactor can have any shape known in the art. In some aspects, the reactor is a tube. In other aspects, the reactor is a shell. In yet other aspects, the reactor is a shell and tube reactor or a fluidized-bed reactor. It is further understood that the dimensions of the reactor can be easily determined by one of ordinary skill in the art depending on the desired outcome. In some aspects, it is understood that the size of the reactor can be fitted to house a sufficient amount of $CO_2$ sorbent effective to react with a desired amount of $CO_2$. For example, an excess amount of $CO_2$ sorbent can be present in the reactor relative to the amount of $CO_2$ that is introduced into the reactor, thereby maximizing the efficiency of the $CO_2$ that is introduced into the reactor In some aspects, the system can further comprise a heat source configured to be in fluid communication with the supercritical $CO_2$ source and the reactor.

In certain aspects, the heat source present in the system can comprise a solar thermal energy source; for example. In the exemplary aspects, wherein the heat source comprises a solar thermal energy source, the solar energy can be concentrated and directed using mirrors for direct heating of the supercritical $CO_2$. In yet other aspects, the heat source present in the system can increase the temperature of the supercritical $CO_2$ to a temperature of at least about 500° C., at least about 550° C., at least about 600° C., at least about 650° C., at least about 700° C., at least about 750° C., at least about 800° C., at least about 850° C., at least about 900° C., or at least about 950° C. For example, the heat source present in the system can increase the temperature of the supercritical $CO_2$ to a temperature of from about 500° C. to about 950° C., for example from about 600° C. to about 800° C. In yet other aspects, the heat source can comprise any heat source known in the art, for example and without limitation, a gas fire plant, a nuclear reactor, and the like. The supercritical $CO_2$ that has been heated by the heat source is then introduced into the reactor.

In another aspect, the system can further comprise a pump configured to pump supercritical $CO_2$ from the supercritical $CO_2$ source towards the heat source and/or reactor. The supercritical $CO_2$ that exits the supercritical $CO_2$ source can be compressed in a compressor and is in a dense form. Accordingly, the system can further comprise a compressor configured to be in fluid communication with the supercritical $CO_2$ source and the heat source and/or reactor. It is suitable for a pump to transfer this dense supercritical $CO_2$ towards the heat source and/or reactor.

In another aspect, the system can further comprise one or more heat exchangers configured to be in fluid communication with the supercritical $CO_2$ source, the reactor, and the heat source. The supercritical $CO_2$ that is pumped towards the heat source and/or reactor passes through the one or more heat exchangers which has a higher temperature than the supercritical $CO_2$, thereby increasing the temperature of the supercritical $CO_2$. The temperature of the than the supercritical $CO_2$ can be increased by the one or more heat exchangers to a temperature from about 450° C. to about 700° C. During discharge this supercritical $CO_2$ having a temperature from about 450° C. to about 650° C. is used directly to react $CO_2$ with MgO to produce $MgCO_3$ and heat. Said differently, this supercritical $CO_2$ having a temperature from about 450° C. to about 650° C. is used in the reactor without being further heated by the heat source. During the charge supercritical $CO_2$ having a temperature from about 450° C. to about 650° C. is further heated by the heat source before use in the reactor to drive the endothermic degradation of $MgCO_3$ to MgO and $CO_2$.

In another aspect, the system can further comprise a turbine configured to be in fluid communication with an outlet of the reactor. During the discharge cycle the $CO_2$, which has been heated by the exothermic reaction in the reactor, exits the reactor and is expanded in the turbine to produce electricity.

In another aspect, the system can further comprise a cooling unit configured to be in fluid communication with an outlet of the reactor and the supercritical $CO_2$ source. The cooling unit is used to cool $CO_2$ so it can be stored in the supercritical $CO_2$ source. The heat absorbed by the cooling unit can later be used to heat the supercritical $CO_2$ present in the supercritical $CO_2$ source to be used in the subsequent cycle.

In another aspect, the system further comprises a cooling unit configured to be in fluid communication with an outlet of the reactor, the one or more heat exchangers, and the supercritical $CO_2$ source. In such an aspect, the cooling unit is configured to receive $CO_2$ after the $CO_2$ has passed through the one or more heat exchangers from the outlet of the reactor.

In another aspect, the system can further comprise a sensible heat storage unit configured to be in fluid communication with the supercritical $CO_2$ source and the heat source and/or reactor. The sensible heat storage unit is configured to receive $CO_2$ from a charging cycle, for example, as shown in FIG. 1. The sensible heat storage unit reduces the temperature of the $CO_2$ before the $CO_2$ is transferred to the supercritical $CO_2$ source for storage. The heat absorbed in the sensible heat storage unit can be used heat the supercritical $CO_2$ in the supercritical $CO_2$ source before use in the next cycle.

In another aspect, the system disclosed herein is a closed loop system.

In another aspect, the system is an industrial sized system.

FIG. 1 shows an exemplary thermochemical storage energy system 100. This exemplary thermochemical storage energy system 100 is comprised of a reactor 102, a supercritical $CO_2$ source 104, heat source 106, one or more heat exchangers 108, a turbine 110, a cooling unit 112, a sensible heat storage unit 114, a low temperature compressor 116, and a high temperature compressor 118. The reactor 102, for example a single pressure reactor, contains a fixed bed of the $CO_2$ sorbent comprising MgO. Supercritical $CO_2$ is stored in the supercritical $CO_2$ source 104 at about 74 atm at about 31° C. The supercritical $CO_2$ is heated to about 100° C. using heat absorbed in the cooling unit 112 or the sensible heat storage unit 114 or a combination thereof. The heated supercritical $CO_2$ is compressed in a low temperature compressor 116 and further heated in the one or more heat exchangers 108. To discharged the reactor 102, the supercritical $CO_2$, which has a from about 450° C. to about 650° C., for example from about 550° C. to about 600° C., bypasses the heat source 106 and enters the reactor, for example at a pressure around 10 atm. The $CO_2$ can be in the form of a gas or at a supercritical state in the reactor 102. A portion of the $CO_2$ reacts with the MgO present in the $CO_2$ sorbent to form $MgCO_3$ and release heat, i.e. this reaction is exothermic. The heat increases the temperature of the unreacted $CO_2$, which is next expanded in the turbine 110, which generates electricity. The expanded unreacted $CO_2$ is cooled in the one or more heat exchangers 108 and the cooling unit 112 before entering the supercritical $CO_2$ source 104 to be stored at about 74 atm at about 31° C.

To charge the reactor 102, supercritical $CO_2$ is again heated to about 100° C. using heat absorbed in the cooling unit 112 or the sensible heat storage unit 114 or a combination thereof. The heated supercritical $CO_2$ is again compressed in a low temperature compressor 116 and further heated in the one or more heat exchangers 108. This time, the supercritical $CO_2$ is even further heated in the heat source 106 to a temperature from about 600° C. to about 800° C., for example, from about 650° C. to about 750° C. This heated $CO_2$ (supercritical or gas or combination thereof) enters the reactor 102 to decompose the $MgCO_3$ to MgO and $CO_2$. This $CO_2$ is separated from the sorbent and transferred of the reactor together with the heated $CO_2$ and is transferred to a sensible heat storage unit 114 to be cooled. The $CO_2$ is then further cooled in the in the one or more heat exchangers 108 and the cooling unit 112 before entering the supercritical $CO_2$ source 104 to be stored at about 74 atm at about 31° C.

As shown in FIG. 2 an isothermic cycle proceeds counterclockwise in four stages 1) decarbonation of $MgCO_3$ to charge the system with latent heat 2) raising the temperature of the MgO-based sorbent with sensible heat 3) discharging the system of latent heat by carbonation at 675° C. 4) discharging the system of sensible heat.

Figure 3:
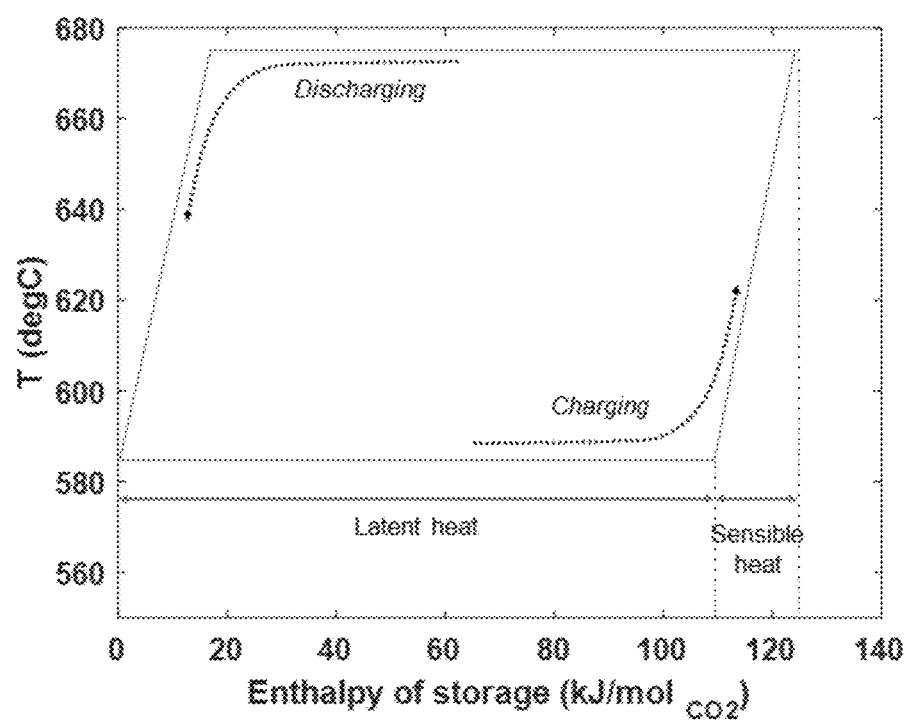
FIG. 3 shows an isothermal cycle of a method disclosed herein.

FIG. 3 shows an isothermal cycle of a system and method disclosed herein. FIG. 3 shows that the system and method disclosed here can be operated with low temperature differences, which is beneficial to the efficiency of the system.

Figure 5:
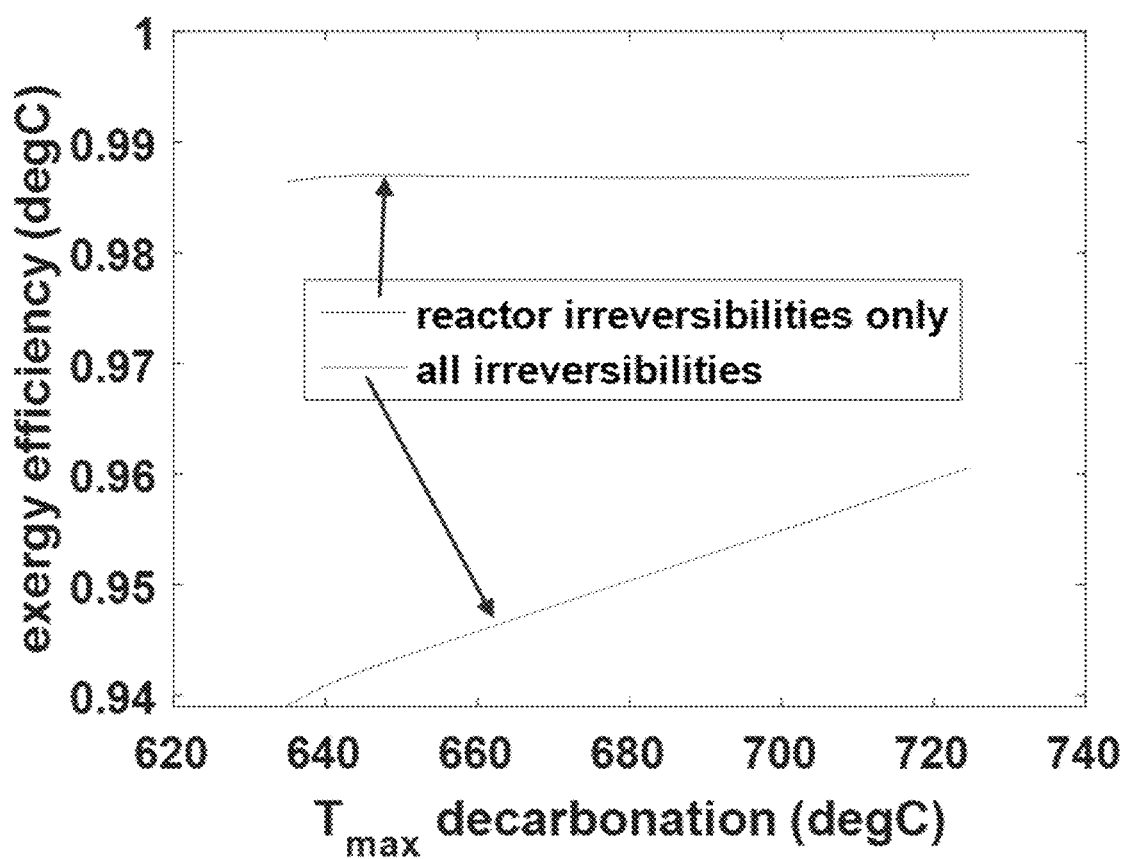
FIG. 5 shows the energy of a system disclosed herein with all irreversibles or reactor irreversibles only.

The exergy of a system disclosed herein with all irreversibles or reactor irreversibles only is shown in FIG. 5.

3. Methods

Disclosed herein is a method for storing energy. In some aspects disclosed herein is a method of storing energy comprising the steps of: a) in a reactor, in the presence of $H_2O$ and/or a carbonate, heating $MgCO_3$ with supercritical $CO_2$ having a temperature of at least 450° C., thereby promoting an endothermic chemical reaction to produce $CO_2$ and MgO; and b) separating the $CO_2$ from the MgO.

Also disclosed herein is a method of storing energy comprising contacting $MgCO_3$ with supercritical $CO_2$ having a temperature of at least 450° C. in the presence of $H_2O$ and/or a carbonate in the system disclosed herein, to thereby store energy.

In one aspect, the heating the $MgCO_3$ with supercritical $CO_2$ is in the presence of $H_2O$.

In one aspect, the method can further comprise a step c) combining supercritical $CO_2$ having a temperature of less than about 700° C. with the MgO in the reactor, thereby promoting an exothermic chemical reaction to produce heat and $MgCO_3$. In one aspect, the produced heat can increase the temperature of unreacted supercritical $CO_2$ to produce heated unreacted supercritical $CO_2$, and wherein the heated unreacted supercritical $CO_2$ is expanded in a turbine to generate electricity. In yet another aspect, the expanded heated unreacted supercritical $CO_2$ can be cooled via one or more heat exchangers and a cooling unit before being stored in a supercritical $CO_2$ source.

Energy is stored as a potential future chemical reaction between $CO_2$ and the MgO in the $CO_2$ sorbent. As described elsewhere herein, the chemical reaction between $CO_2$ and the MgO in the $CO_2$ sorbent is exothermic and, energy in the form of heat is released.

In one aspect, the method can further comprise transporting at least a portion of the separated $CO_2$ to a supercritical $CO_2$ source via one or more heat exchangers and a cooling unit. The MgO in the $CO_2$ sorbent is, once separated and not in the presence of $CO_2$, available to be recombined with $CO_2$ to form $MgCO_3$.

It is understood that the reactor can comprise any reactor described herein. For example and without limitation it can comprise a heat exchange reactor, or an adiabatic reactor. In certain aspects, the $CO_2$ sorbent can comprise any $CO_2$ sorbent described herein.

In certain aspects, the method comprising steps (a) and (b) or the method comprising steps (a) through (c) of the disclosed method can be repeated for at least about 100 times, for at least about 200 times, at least about 500 times, at least about 1,000 times, at least about 1,500 times, at least about 2,000 times, at least about 2,500 times, at least about 3,000 times, at least about 3,500 times, at least about 4,000 times, at least about 4,500 times, at least about 5,500 times, at least about 6,000 times, at least about 6,500 times, at least about 7,000 times, at least about 7,500 times, at least about 8,000 times, at least about 8,500 times, at least about 9,000 times, at least about 9,500 times, at least about 10,000 times, at least about 10,500 times, at least about 11,000 times, at least about 11,500 times, at least about 12,000 times, at least about 12,500 times, at least about 13,000 times, at least about 13,500 times, at least about 14,000 times, at least about 14,500 times, at least about 15,500 times, at least about 16,000 times, at least about 16,500 times, at least about 17,000 times, at least about 17,500 times, at least about 18,000 times, at least about 18,500 times, at least about 19,000 times, at least about 19,500 times, at least about 20,000 times, at least about 20,500 times, at least about 21,000 times, at least about 21,500 times, at least about 22,000 times, at least about 22,500 times, at least about 23,000 times, at least about 23,500 times, at least about 24,000 times, at least about 24,500 times, at least about 25,500 times, at least about 26,000 times, at least about 26,500 times, at least about 27,000 times, at least about 27,500 times, at least about 28,000 times, at least about 28,500 times, at least about 29,000 times, at least about 29,500 times, or at least about 30,000 times.

In yet other aspects, the method comprising steps (a) through (c) can be repeated at least 1,000 time, wherein the amount of $CO_2$ can be reacted with the $CO_2$ sorbent in step c) throughout the method is at least 50% of the amount of $CO_2$ that could be reacted with the $CO_2$ sorbent prior to performing the method. In some aspects, the amount of $CO_2$ that could be reacted with the $CO_2$ sorbent is at least about 50%, at least about 55%, at least about 60%, at least about 65%, at least about 70%, at least about 75%, at least about 80%, at least about 85%, at least about 90%, at least about 95%, or at least about 99% of the amount of $CO_2$ that could be reacted with the $CO_2$ sorbent prior to performing the method.

In certain aspects, the steps (a) through (c) can be repeated from 1,000 to 20,000 times, wherein the amount of $CO_2$ that can be reacted with the $CO_2$ sorbent in step c) throughout the method is at least 50% of the amount of $CO_2$ that could be reacted with the $CO_2$ sorbent prior to performing the method. In some aspects, the amount of $CO_2$ that could be reacted with the $CO_2$ sorbent is at least about 50%, at least about 55%, at least about 60%, at least about 65%, at least about 70%, at least about 75%, at least about 80%, at least about 85%, at least about 90%, at least about 95%, or at least about 99% of the amount of $CO_2$ that could be reacted with the $CO_2$ sorbent prior to performing the method.

Aspects

In view of the described systems and methods and variations thereof, herein below are described certain more particularly described aspects of the inventions. These particularly recited aspects should not however be interpreted to have any limiting effect on any different claims containing different or more general teachings described herein, or that the "particular" aspects are somehow limited in some way other than the inherent meanings of the language and formulas literally used therein.

Aspect 1: A system for storing energy comprising: a) a reactor comprising a $CO_2$ sorbent comprising MgO; and b) a supercritical $CO_2$ source comprising supercritical $CO_2$ and $H_2O$, wherein the supercritical $CO_2$ source is in fluid communication with the reactor and the $CO_2$ sorbent comprising MgO to allow flow of the supercritical $CO_2$ and $H_2O$ between the supercritical $CO_2$ source and the reactor, thereby allowing contact of $CO_2$ with the $CO_2$ sorbent comprising MgO.

Aspect 2: A system for storing energy comprising: a) a reactor comprising a $CO_2$ sorbent comprising MgO and a liquid carbonate promoter; and b) a supercritical $CO_2$ source comprising supercritical $CO_2$, wherein the supercritical $CO_2$ source is in fluid communication with the reactor and the $CO_2$ sorbent comprising MgO to allow flow of the supercritical $CO_2$ between the supercritical $CO_2$ source and the reactor, thereby allowing contact of $CO_2$ with the $CO_2$ sorbent comprising MgO.

Aspect 3: The system of aspect 1, wherein the ratio of $H_2O$ to supercritical $CO_2$ in the supercritical $CO_2$ source is from $3.6*10^{-5}$% by weight to 1% by weight.

Aspect 4: The system of aspect 2, wherein the ratio of liquid carbonate to MgO in the reactor is from 1% by weight to 50% by weight.

Aspect 5: The system of aspects 2 or 4, wherein the carbonate is selected from the group consisting of sodium carbonate, lithium carbonate, and potassium carbonate, or a mixture thereof.

Aspect 6: The system of any one of aspects 1-5, wherein the system further comprises a heat source configured to be in fluid communication with the supercritical $CO_2$ source and the reactor.

Aspect 7: The system of aspect 6, wherein the system further comprises a pump configured to pump supercritical $CO_2$ from the supercritical $CO_2$ source towards the heat source and/or reactor.

Aspect 8: The system of aspect 7, wherein the system further comprises one or more heat exchangers configured to be in fluid communication with the supercritical $CO_2$ source, the reactor, and the heat source.

Aspect 9: The system of any one of aspects 1-8, wherein the system further comprises a turbine configured to be in fluid communication with an outlet of the reactor.

Aspect 10: The system of any one of aspects 6-9, wherein the system further comprises a compressor configured to be in fluid communication with the supercritical $CO_2$ source and the heat source and/or reactor.

Aspect 11: The system of any one of aspects 1-10, wherein the system further comprises a cooling unit configured to be in fluid communication with an outlet of the reactor and the supercritical $CO_2$ source.

Aspect 12: The system of any one of aspects 8-11, wherein the system further comprises a cooling unit configured to be in fluid communication with an outlet of the reactor, the one or more heat exchangers, and the supercritical $CO_2$ source.

Aspect 13: The system of any one of aspects 6-12, wherein the system further comprises a sensible heat storage unit configured to be in fluid communication with the supercritical $CO_2$ source and the heat source and/or reactor.

Aspect 14: The system of any one of aspects 1-13, wherein the reactor is a heat exchange reactor.

Aspect 15: The system of any one of aspects 6-14, wherein the heat source is a solar thermal energy source.

Aspect 16: The system of any one of aspects 1-14, wherein the system is a closed loop system.

Aspect 17: A method of storing energy comprising the steps of: a) in a reactor, in the presence of $H_2O$ and/or a carbonate, heating $MgCO_3$ with supercritical $CO_2$ having a temperature of at least 450° C., thereby promoting an endothermic chemical reaction to produce $CO_2$ and MgO; and b) separating the $CO_2$ from the MgO.

Aspect 18: The method of aspect 17, wherein heating the $MgCO_3$ with supercritical $CO_2$ is in the presence of $H_2O$.

Aspect 19: The method of any one of aspects 17 or 18, wherein heating the $MgCO_3$ with supercritical $CO_2$ is in the presence of a carbonate.

Aspect 20: The method of any one of aspects 17-19, wherein the method further comprises transporting at least a portion of the separated $CO_2$ to a supercritical $CO_2$ source via one or more heat exchangers and a cooling unit.

Aspect 21: The method of any one of aspects 17-20, wherein the method further comprises step c) in the presence of $H_2O$ and/or a carbonate, combining supercritical $CO_2$ having a temperature of less than about 700° C. with the MgO in the reactor, thereby promoting an exothermic chemical reaction to produce heat and $MgCO_3$.

Aspect 22: The method of aspect 21, wherein the heat increases the temperature of unreacted supercritical $CO_2$ to produce heated unreacted supercritical $CO_2$, and wherein the heated unreacted supercritical $CO_2$ is expanded in a turbine to generate electricity.

Aspect 23: The method of aspect 22, wherein the expanded heated unreacted supercritical $CO_2$ is cooled via one or more heat exchangers and a cooling unit before being stored in a supercritical $CO_2$ source.

Aspect 24: The method of aspect 20, wherein the method further comprises, prior to step a), increasing the temperature of the supercritical $CO_2$ in a supercritical $CO_2$ source by transferring heat from the cooling unit and/or a latent heat storage unit to the supercritical $CO_2$ source.

Aspect 25: The method of any one of aspects 21-24, wherein steps a)-c) are repeated at least 1,000 times, wherein the amount of $CO_2$ that can be reacted with the MgO in step c) throughout the method is at least 50% of the amount of $CO_2$ that could be reacted with the MgO prior to performing the method.

Aspect 26: The method of any one of aspects 21-24, wherein steps a)-c) are repeated from 1,000 to 20,000 times, wherein the amount of $CO_2$ that can be reacted with the MgO in step c) throughout the method is at least 50% of the amount of $CO_2$ that could be reacted with the MgO prior to performing the method.

Aspect 27: A method of storing energy comprising contacting $MgCO_3$ with supercritical $CO_2$ having a temperature of at least 450° C. in the presence of $H_2O$ and/or a carbonate in the system of aspect 1, to thereby store energy.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1

Figure 10:
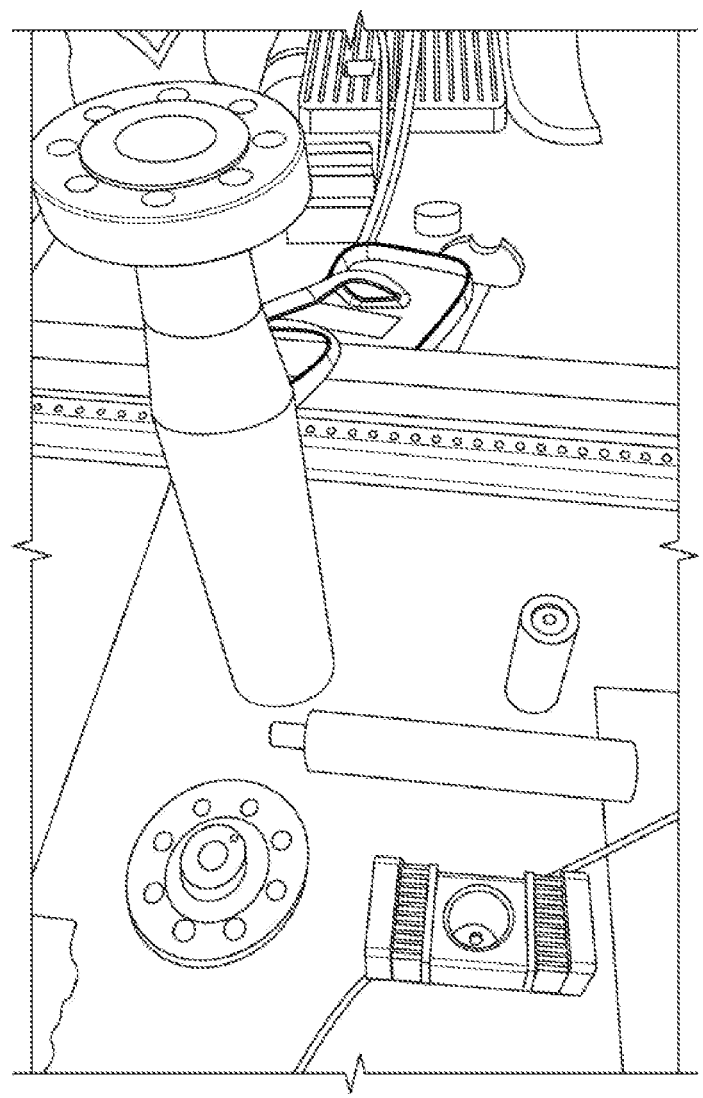
FIG. 10 shows a non-limiting example of a reactor that was used in experiments.
Figure 11:
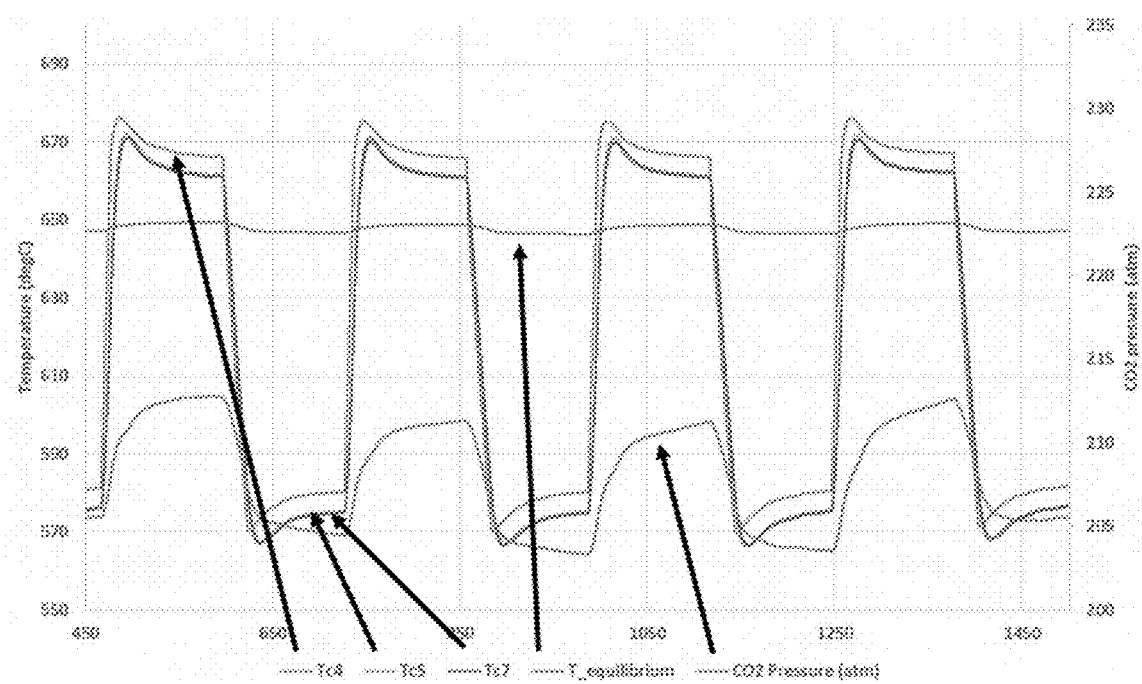
FIG. 11 shows a run chart for four cycles at 4 hr cycle times at an equilibrium temperature around 650° C.

A reactor, see FIG. 10, was used to validate the $CO_2$ mass balance technique and the MgO/$MgCO_3$ equilibrium curve of MgO. A Na/K/Li carbonate salt blend (at 30 wt %) was also added to the reactor. FIG. 11 shows the run chart for four cycles at 4 hr cycle times at an equilibrium temperature around 650° C. Such a condition is commercially relevant. The temperature was measured from outside the vessel instead of directly at the sorbent, therefore the $\Delta T$ to drive the process is reported larger than what the actual $\Delta T$ should be. The shape of the pressure curve suggests a transition from 1st (island growth) to 2nd (diffusion limited) reaction regimes. Therefore, it can be concluded that the carbonate salt exhibits desired kinetics.

A MgO sorbent was synthesized. No promoter was added to the MgO sorben. As a screening before testing the sorbent was held in a furnace at 650° C. in air (decarbonated state) and the surface area was measured at 16, 32, and 80 hr to be 49.86, 49.76 and 50.36 $m^2/g$, respectively. The surface area of this MgO sorbent is stable at 10× the magnitude of a comparable CaO sorbent, which has recently demonstrated no long-term degradation under 600 accelerated cycles in the thermogravimetric analysis (TGA). The stability is not unexpected because the melting temperature of MgO is 239° C. higher than CaO, which results in a lower homologous temperature $T_H = T/T_{melt}$ and less mass diffusion and sintering. The tapped density was measured to be 834 $kg/m^3$. The system was commissioned and the experiment ran for 2 days. Leaks at the high temperature seals limited the time between recharges to ~8 hrs. The system design, instrumentation, operation and sensitivity of the analysis method were all proven successful. The sorbent performance can be summarized by a single observed decarbonation half cycle beginning at 126 atm and 615.8° C. The sorbent released 4.31 g of $CO_2$ over 29.5 min which equates to a $CO_2$ weight gain of 26.9%. This is a lower bound estimate if the simultaneous system leak rate was accounted for, this mass of $CO_2$ released would be higher.

Figure 6:
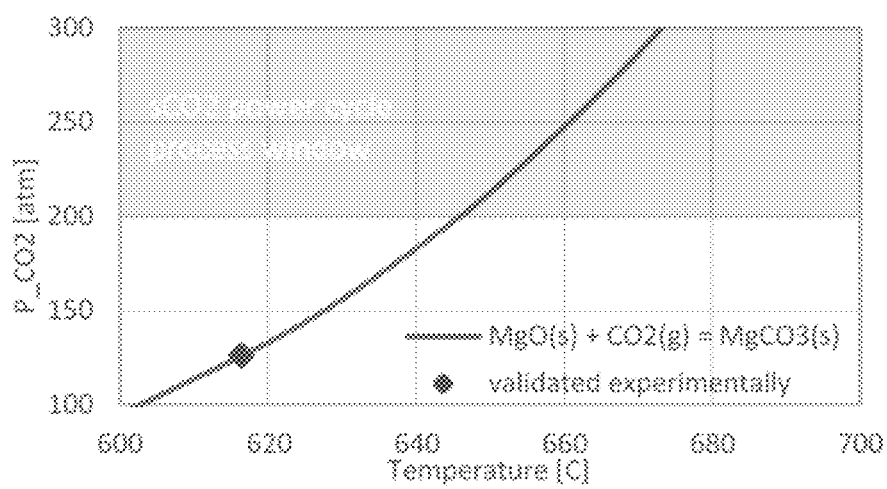
FIG. 6 shows a plot of the equilibrium $CO_2$ partial pressure vs. temperature for $MgCO_3$ within a supercritical $CO_2$ power cycle.
Figure 7:
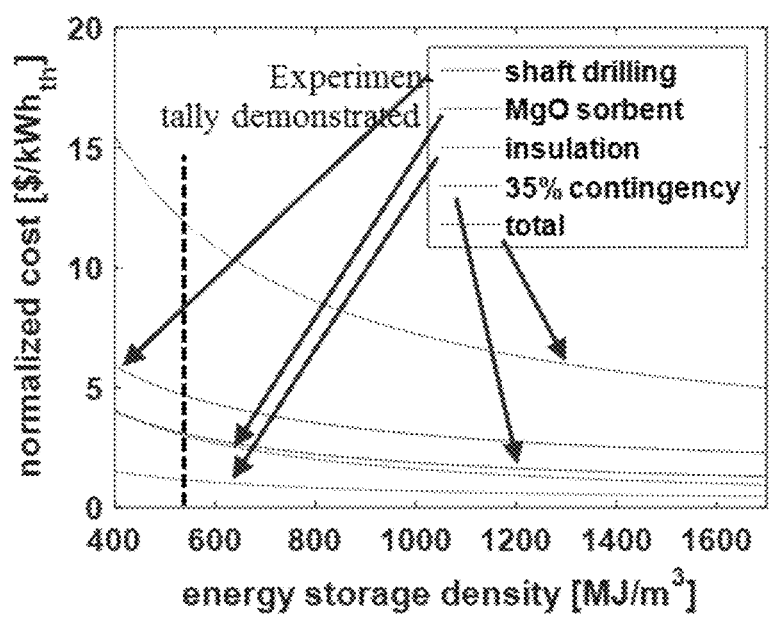
FIG. 7 shows the itemized cost versus energy storage density of the material. Assuming a d=16 [m] shaft diameter.

The following conclusions can be drawn: 1) the equilibrium curve predicted by thermochemical modeling is verified (FIG. 6), 2) the reaction kinetics are fast enough that a promoter may not be necessary 3) the overall energy capacity equates to 547 $MJ/m^3$ which is within TEA targets (FIG. 7), 4) the low-cost manufacturing method is suitable for this application. Although the long-term durability of the sorbent has not been characterized, there are still many parameters to optimize for increased performance, including the addition of promoters.

Figure 8:
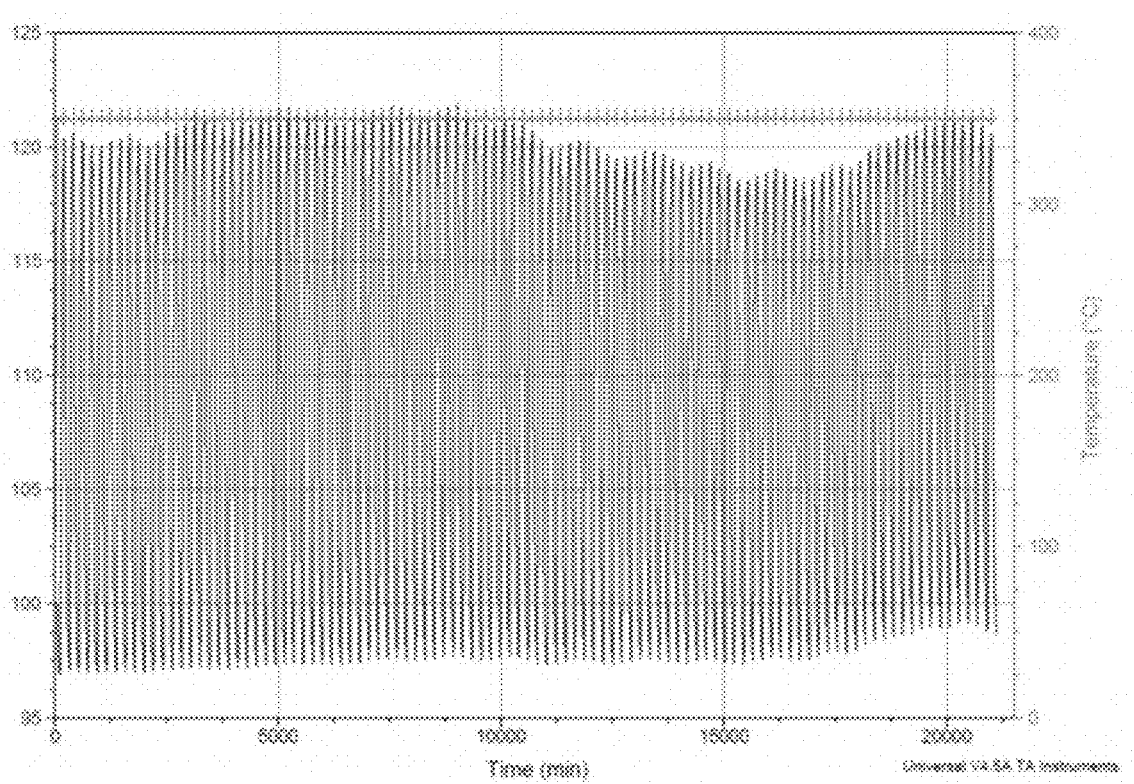
FIG. 8 shows the behavior of a MgO sorbent over 150 cycles.

It was also demonstrated a stable weight gain of 25% for the MgO-based sorbent at 350° C. (FIG. 8).

What is claimed is:

1. A system for storing energy comprising:
   a) a reactor comprising a $CO_2$ sorbent comprising MgO; and
   b) a supercritical $CO_2$ source comprising supercritical $CO_2$ and $H_2O$, wherein the supercritical $CO_2$ source is in fluid communication with the reactor and the $CO_2$ sorbent comprising MgO to allow flow of the supercritical $CO_2$ and $H_2O$ between the supercritical $CO_2$ source and the reactor, thereby allowing contact of $CO_2$ with the $CO_2$ sorbent comprising MgO,
   wherein the system further comprises a heat source configured to be in fluid communication with the supercritical $CO_2$ source and the reactor.

2. The system of claim 1, wherein the ratio of $H_2O$ to supercritical $CO_2$ in the supercritical $CO_2$ source is from $3.6 \times 10^{-5}$% by weight to 1% by weight.

3. The system of claim 1, wherein the system further comprises a pump configured to pump supercritical $CO_2$ from the supercritical $CO_2$ source towards the heat source and/or reactor.

4. The system of claim 3, wherein the system further comprises one or more heat exchangers configured to be in fluid communication with the supercritical $CO_2$ source, the reactor, and the heat source.

5. The system of claim 1, wherein the system further comprises a turbine configured to be in fluid communication with an outlet of the reactor.

6. The system of claim 1, wherein the system further comprises a cooling unit configured to be in fluid communication with an outlet of the reactor and the supercritical $CO_2$ source.

7. The system of claim 4, wherein the system further comprises a cooling unit configured to be in fluid communication with an outlet of the reactor, the one or more heat exchangers, and the supercritical $CO_2$ source.

8. The system of claim 1, wherein the system further comprises a sensible heat storage unit configured to be in fluid communication with the supercritical $CO_2$ source and the heat source and/or reactor.

9. The system of claim 1, wherein the reactor is a heat exchange reactor.

10. The system of claim 1, wherein the heat source is a solar thermal energy source.

11. The system of claim 1, wherein the system is a closed loop system.

12. A method of storing energy comprising contacting $MgCO_3$ with supercritical $CO_2$ having a temperature of at least 450° C. in the presence of $H_2O$ and/or a carbonate in the system of claim 1, to thereby store energy.

13. A system for storing energy comprising:
    a) a reactor comprising a $CO_2$ sorbent comprising MgO and a liquid carbonate promoter; and
    b) a supercritical $CO_2$ source comprising supercritical $CO_2$, wherein the supercritical $CO_2$ source is in fluid communication with the reactor and the $CO_2$ sorbent comprising MgO to allow flow of the supercritical $CO_2$ between the supercritical $CO_2$ source and the reactor, thereby allowing contact of $CO_2$ with the $CO_2$ sorbent comprising MgO.

14. The system of claim 13, wherein the ratio of liquid carbonate to MgO in the reactor is from 1% by weight to 50% by weight.

15. The system of claim 13, wherein the carbonate is selected from the group consisting of sodium carbonate, lithium carbonate, and potassium carbonate, or a mixture thereof.

16. A method of storing energy comprising the steps of:
    a) in a reactor, in the presence of $H_2O$ and/or a carbonate, heating $MgCO_3$ with supercritical $CO_2$ having a temperature of at least 450° C., thereby promoting an endothermic chemical reaction to produce $CO_2$ and MgO; and
    b) separating the $CO_2$ from the MgO.

17. The method of claim 16, wherein the method further comprises transporting at least a portion of the separated $CO_2$ to a supercritical $CO_2$ source via one or more heat exchangers and a cooling unit.

18. The method of claim 16, wherein the method further comprises step c) in the presence of $H_2O$ and/or a carbonate, combining supercritical $CO_2$ having a temperature of less than about 700° C. with the MgO in the reactor, thereby promoting an exothermic chemical reaction to produce heat and $MgCO_3$.

19. The method of claim 18, wherein steps a)-c) are repeated from 1,000 to 20,000 times, wherein the amount of $CO_2$ that can be reacted with the MgO in step c) throughout the method is at least 50% of the amount of $CO_2$ that could be reacted with the MgO prior to performing the method.

* * * * *